United States Patent [19]

Williams et al.

[11] Patent Number: 5,001,708
[45] Date of Patent: Mar. 19, 1991

[54] SONET H4 BYTE GENERATOR

[75] Inventors: Timothy J. Williams; Ertugrul Baydar, both of Raleigh, N.C.

[73] Assignee: Alcatel NA, Hickory, N.C.

[21] Appl. No.: 351,184

[22] Filed: May 12, 1989

[51] Int. Cl.⁵ .............................. H04J 3/06; H04J 3/12
[52] U.S. Cl. ................................ 370/105.1; 370/110.1; 375/116
[58] Field of Search ............... 370/110.1, 100.1, 105.1, 370/94.1, 94.2, 94.3, 112; 375/114, 116

[56] References Cited
U.S. PATENT DOCUMENTS 4,719,624  1/1988  Bellisio .............................. 370/105.1
4,835,768  5/1989  Hubbard et al. ...................... 375/116

Primary Examiner—Douglas W. Olms
Assistant Examiner—Wellington Chin
Attorney, Agent, or Firm—Peter C. Van Der Sluys

[57] ABSTRACT

An H4 byte generating algorithm is implemented by circuitry which includes counters for generating the H4 byte. The circuit is provisioned to indicate whether it is operating in a terminal multiplexer mode or an add-drop multiplexer mode. In the terminal multiplexer mode the counters are allowed to free run and continually produce successive H4 byte outputs. In the add-drop multiplexer mode selected counter outputs are compared with the received H4 byte and the number of mismatches is accumulated by a mismatch counter. When the mismatch counter reaches a predetermined number the value of the received H4 byte is loaded into the H4 byte counters and the mismatch counter is reset. Each time a proper match between H4 counter outputs and the received H4 byte is sensed, the mismatch counter is reset to 0. The presence of a red alarm will also result in the resetting of the mismatch counter and free running of the H4 byte counters.

9 Claims, 11 Drawing Sheets

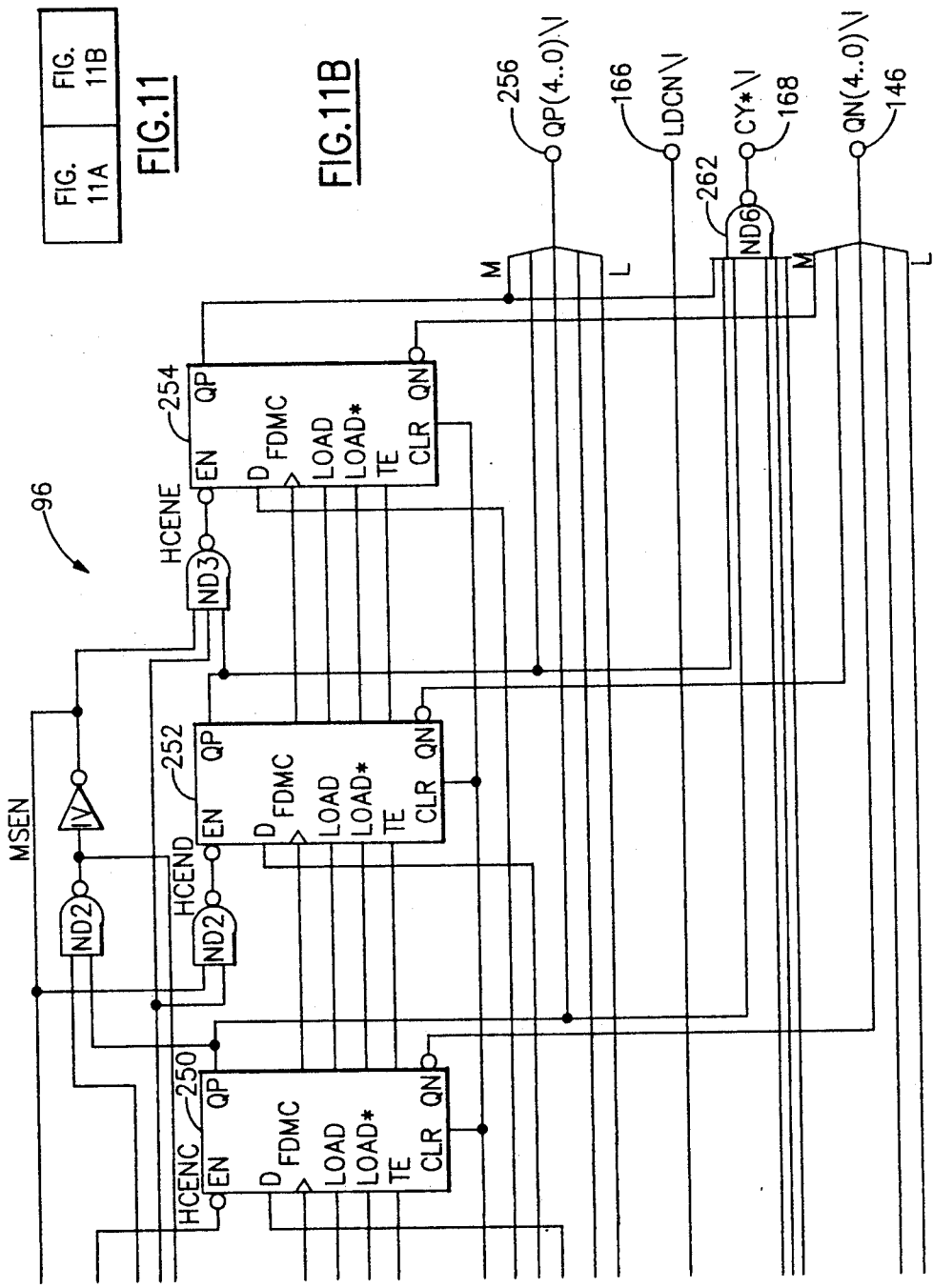

SONET H4 BYTE GENERATOR

BACKGROUND OF THE INVENTION

The present invention relates to SONET transmission systems, and more particularly to apparatus for generating the SONET Path Overhead H4 Multiframe Indicator byte.

Description of the Prior Art

The American National Standard Institute, Inc. (ANSI) T1.105-1988 describes the Synchronous Optical Network (SONET) protocol for telecommunications equipment. This standard is incorporated herein by reference. The SONET protocol is particularly adapted for optical transmission, and various transmission levels have been standardized at specified line rates in M bit/s. The first level, Optical Carrier Level 1, or OC-1, transmits data at the rate of 51.84M bits/s. This carrier level has a corresponding electrical level called Synchronous Transport Signal Level 1, or STS-1.

In order to access this high-frequency carrier level, access products are required so that lower bandwidth carriers can be introduced into or extracted from the STS-1 transmission level. These access products provide a SONET network with nodes where components of an STS-1 signal can be added to or dropped out of the main signal. The components that are added must have their signaling reorganized for insertion into the SONET format. A typical sub-component of an STS-1 signal would be a DS1 signal having a bit rate of 1.544M bits/s. Twenty-eight DS1 signals can be supported by an STS-1 carrier. Within the DS1 signal format, an additional 24 DS0 64K bits/s signals can be supported.

The SONET transmission is serial in frames, comprising a total of 810 bytes each. The frame structure for an STS-1 is shown in FIG. 1. The frame comprises 90 columns ×9 rows of bytes, with 8 bits per byte. The sequence of transmission of the bytes is row by row, from left to right. The frame is divided into three parts: the section and line overhead, which are contained in the first three columns; and the payload, which is found in the 87 remaining columns, which, in connection with the nine rows, form a Synchronous Payload Envelope, SPE, which includes 783 bytes. The SPE can begin anywhere within the 87×9 byte envelope. Typically, the SPE begins in one SONET frame and ends in another. A payload pointer provided in overhead bytes H1 and H2 points to the byte where the SPE begins, shown as P=0 in FIG. 1. Nine of the SPE bytes are allocated to path overhead. These bytes appear in one column, which can be any column in the SPE. The first path overhead byte is J1, which is always in the first SPE byte, P=0.

The information within the SPE is transported in Sub-STS-1 payloads called Virtual Tributaries, or VTs. There are several levels of VTs; however, it is only necessary to deal with VT 1.5 for purposes of describing this invention. When the STS-1 payload supports 28 DS1 services, one VT at the 1.5 level is provided for each DS1 service. FIG. 2 illustrates the payload mapping of SONET bytes into a DS1.

An SPE consists of 783 bytes belonging to 28 tributaries, wherein each tributary can carry a DS1 payload, as illustrated in FIG. 2. A DS1 payload has 27 bytes, 24 of which carry DS0 channels. The first byte carries a VT pointer, or address; a second byte is unused; and the third byte carries signaling data for the DS1 payload. Every channel requires four signaling bits, namely, A, B, C and D, as is well known in the telephony art. For a DS1 payload of 24 channels, a total of 96 signaling bits are required. Since only four bits of signaling are carried in each SONET signaling byte and there is only one signaling byte per tributary or DS1, a total of 24 SONET frames would be required in order to transmit the 96 required signaling bits for a DS1, these 24 frames are cumulatively called a superframe or a signaling frame.

The access products used to extract and add sub-components to the STS-1 transmission level include both an add-drop multiplexer and a terminal multiplexer. FIG. 3 shows schematically the function of an add-drop multiplexer 1, wherein an STS-1 level transmission is received at an input 2 in the SONET format, while the sub-components contained therein are provided at an output 3 for connection to DS1/DS0 interface circuitry. Channels to be added to the STS-1 SONET transmission are provided at an input 4 in a DS1/DS0 format. The SONET frame is passed through the add-drop multiplexer to an output 5, where the added channels provided at input 4 are multiplexed with the SONET channels so that the added channels replace the channels of the received SONET frame. In a terminal multiplexer, all received channels are provided to output 3. All transmitted channels are received at input 4 and are provided to output 5, and no channels pass through from input 2 to output 5. The add-drop multiplexer poses special problems, since it facilitates the extraction and/or addition of any number of channels carried on the STS-1 line. Thus, some channels pass directly through an add-drop multiplexer, while some channels are extracted and other channels are added.

From the above, it is apparent that a means must be provided to clearly identify the SONET frames that are being received and transmitted. In addition, it is essential for signaling purposes that the frame identification also indicate the relationship of the frame being received or transmitted to the 24-frame superframe. It is apparent that the 24-frame superframe can be divided into four phases consisting of frames 1-6, 7-12, 13-18 and 19-24 for transmitting respectively the A, B, C and D signaling bits.

To provide for this identification, the SONET protocol defined a specific path overhead byte for identifying, via defined bit sequences, the next SONET frame to be transmitted or received. This byte is referred to as the H4 byte shown in the path overhead column of FIG. 1. The H4 byte serves as a multiframe indicator for signaling and framing purposes. The H4 byte identifies the signaling frame (24-frame superframe) and the framing for the Virtual Tributaries (VTs).

The H4 byte is assigned to column 0 and row 5 of the SPE. However, taking into account that the SPE may start at any location within the 87-column×9-row envelope, the H4 byte can actually appear anywhere, as is shown in FIG. 1. The H4 byte always identifies the next frame that is to arrive or to be transmitted. The format of the H4 byte is as follows:

| Bit No. | MSB 7 | 6 | 5 | 4 | 3 | 2 | 1 | LSB 0 |
|---|---|---|---|---|---|---|---|---|
| Data | P1 | P0 | SI2 | SI1 | C3 | C2 | C1 | T |

The relationship between the H4 bytes and the signaling byte contents are shown in Table 1. Referring to Table 1, it should be noted that the frames are numbered from 0-23. Table 1 shows the bit states for the H4 byte for each frame, and adjacent to that is shown the signaling information for the corresponding SONET byte for what is known as the extended superframe signaling. Bits C3, C2 and C1 of the H4 byte have been deleted from Table 1, primarily because these bits are not relevant to the transmission standards which require the A, B, C and D signaling bits.

TABLE 1

| | SIGNALING FRAME SEQUENCE | | | | | | | |
|---|---|---|---|---|---|---|---|---|
| | H4 | | | | ESF | | | |
| FR | P1 | P0 | SI2 | SI1 | T | S1 | S2 | S3 | S4 |
| 0 | 0 | 0 | 0 | 0 | 0 | A0 | A1 | A2 | A3 |
| 1 | 0 | 0 | 0 | 0 | 1 | A4 | A5 | A6 | A7 |
| 2 | 0 | 0 | 0 | 1 | 0 | A8 | A9 | A10 | A11 |
| 3 | 0 | 0 | 0 | 1 | 1 | A12 | A13 | A14 | A15 |
| 4 | 0 | 0 | 1 | 0 | 0 | A16 | A17 | A18 | A19 |
| 5 | 0 | 0 | 1 | 0 | 1 | A20 | A21 | A22 | A23 |
| 6 | 0 | 1 | 0 | 0 | 0 | B0 | B1 | B2 | B3 |
| 7 | 0 | 1 | 0 | 0 | 1 | B4 | B5 | B6 | B7 |
| 8 | 0 | 1 | 0 | 1 | 0 | B8 | B9 | B10 | B11 |
| 9 | 0 | 1 | 0 | 1 | 1 | B12 | B13 | B14 | B15 |
| 10 | 0 | 1 | 1 | 0 | 0 | B16 | B17 | B18 | B19 |
| 11 | 0 | 1 | 1 | 0 | 1 | B20 | B21 | B22 | B23 |
| 12 | 1 | 0 | 0 | 0 | 0 | C0 | C1 | C2 | C3 |
| 13 | 1 | 0 | 0 | 0 | 1 | C4 | C5 | C6 | C7 |
| 14 | 1 | 0 | 0 | 1 | 0 | C8 | C9 | C10 | C11 |
| 15 | 1 | 0 | 0 | 1 | 1 | C12 | C13 | C14 | C15 |
| 16 | 1 | 0 | 1 | 0 | 0 | C16 | C17 | C18 | C19 |
| 17 | 1 | 0 | 1 | 0 | 1 | C20 | C21 | C22 | C23 |
| 18 | 1 | 1 | 0 | 0 | 0 | D0 | D1 | D2 | D3 |
| 19 | 1 | 1 | 0 | 0 | 1 | D4 | D5 | D62 | D7 |
| 20 | 1 | 1 | 0 | 1 | 0 | D8 | D9 | D10 | D11 |
| 21 | 1 | 1 | 0 | 1 | 1 | D12 | D13 | D14 | D15 |
| 22 | 1 | 1 | 1 | 0 | 0 | D16 | D17 | D18 | D19 |
| 23 | 1 | 1 | 1 | 0 | 1 | D20 | D21 | D22 | D23 |

Referring to Table 1, the T-bit toggles for each STS-1 SONET frame. The T-bit, combined with the SI2 and SI1 bits form a modulo-6 counter. The P1 and P0 bits form a modulo-4 counter. The concatenation of these counters creates a three usec frame for the 24-frame superframe.

A review of Table 1 reveals the sensitivity of the H4 byte data. A single error in one bit of the H4 byte could result in significant errors in the signaling for at least four different channels. Thus, a means was required to prevent erroneous H4 bytes from distorting signaling data. A means was required to generate an H4 byte on the transmit side of an access product, which generation must be synchronized with the received H4 byte in an add-drop multiplexer.

SUMMARY OF THE INVENTION

The present invention contemplates the implementation of a filtering algorithm for the SONET H4 byte, which algorithm was developed to solve the above-mentioned problem. The algorithm operates in two modes: firstly, in a terminal multiplexer, called the TM mode; and secondly, in an add-drop multiplexer, called the ADM mode.

In implementing the algorithm, counters generate an H4 bit sequence, either synchronized to the received H4 byte in the ADM mode, or free running in the TM mode and in the ADM mode under error conditions.

For the generation of an H4 byte on the transmit side, two counters are provided, one for generating bits 0, 4, 5, 6 and 7, and one for generating the C bits, namely, bits 1, 2 and 3. These bits are combined and outputted as the generated H4 byte. In a terminal multiplexer the counters are free running and are continuously incremented each frame with the counter outputs providing the H4 byte. Provisioning from a controller identifies whether the access product is an add-drop multiplexer or a terminal multiplexer, since the algorithm for the generation of the H4 byte differs for an add-drop multiplexer from the free-running counter that is used in a terminal multiplexer.

In the add-drop multiplexer mode of operation, the counters must be synchronized with the incoming H4 byte on the receive side of the access product. The output of the five-bit counter is compared with the corresponding bits of the incoming H4 byte, and if a mismatch occurs, a mismatch counter is incremented. When the mismatch counter reaches a count of six, the five-bit and three-bit counters are loaded with the current value of the incoming H4 byte, and the mismatch counter is reset to 0. The mismatch counter is also reset to 0 when the multiplexer is activated by a reset signal, when the comparator output shows a match between the incoming H4 byte and the five-bit counter output, and when a red alarm signal is received. If certain errors are detected in the system which result in a red alarm, the transmit side of an add-drop multiplexer reverts to a free-running condition and is no longer synchronized to the received H4 byte which may be erroneous due to the error condition.

One objective of the present invention is to provide a filtering algorithm for the SONET H4 byte which is compatible with both terminal multiplexers and add-drop multiplexers.

Another objective of the present invention is to provide for H4 byte generation on the transmit side of an access product.

Another objective of the present invention is to synchronize the generated H4 byte on the transmit side with the received H4 byte on the receive side of an access product.

Another objective of the present invention is to allow for free running of the H4 byte generation on the transmit side if a red alarm is sensed at the receive side of an add-drop multiplexer.

Another objective of the present invention is to generate the H4 byte on the transmit side with counters that are compared with the received H4 byte and set to the value of the received H4 byte if more than a predetermined number of mismatches are sensed.

DESCRIPTION OF THE INVENTION

A filtering algorithm has been developed for compensating for errors that may be introduced in the SONET generation of the path overhead H4 byte. The present invention discloses the filtering algorithm and circuitry for implementing said algorithm. The algorithm is designed to work in SONET add-drop multiplexers and terminal multiplexers. A counter generates the H4 byte and is either synchronized to the received H4 byte in an add-drop multiplexer, or is free running in a terminal multiplexer and in an add-drop multiplexer when an error condition has been sensed.

The received H4 byte identifies the transmitted frame for an add-drop multiplexer, except during an error condition. The H4 byte generation algorithm is designed to operate correctly during add-drop multiplexer error conditions and also when the access product is configured as a terminal multiplexer.

Figure 1:
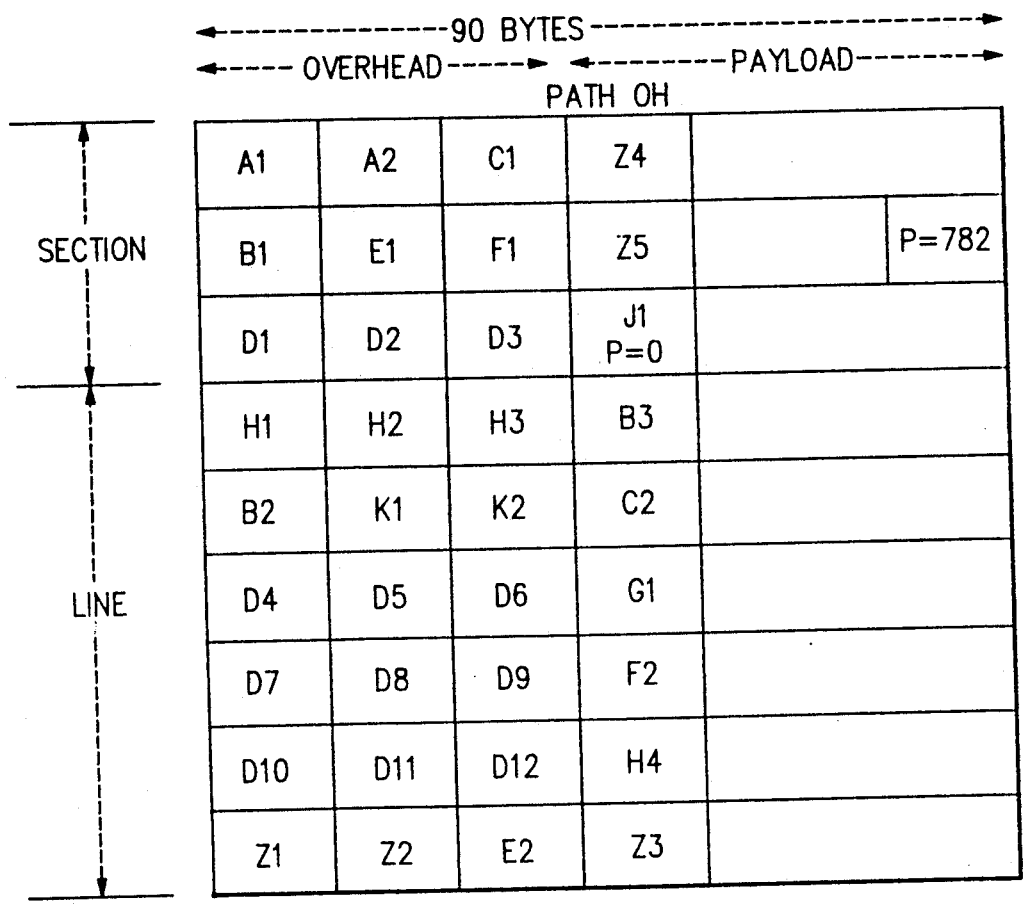
FIG. 1 shows the format of an STS-1 SONET frame.
Figure 2:
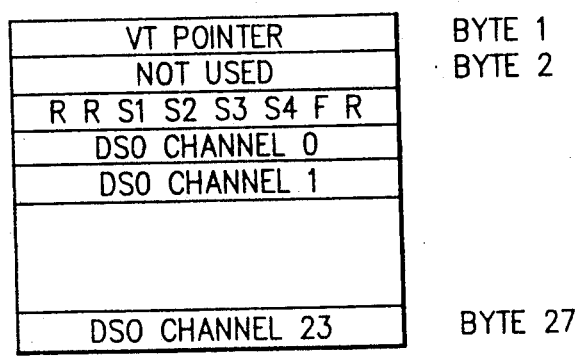
FIG. 2 shows the payload mapping of a DS1 transmission line.
Figure 3:
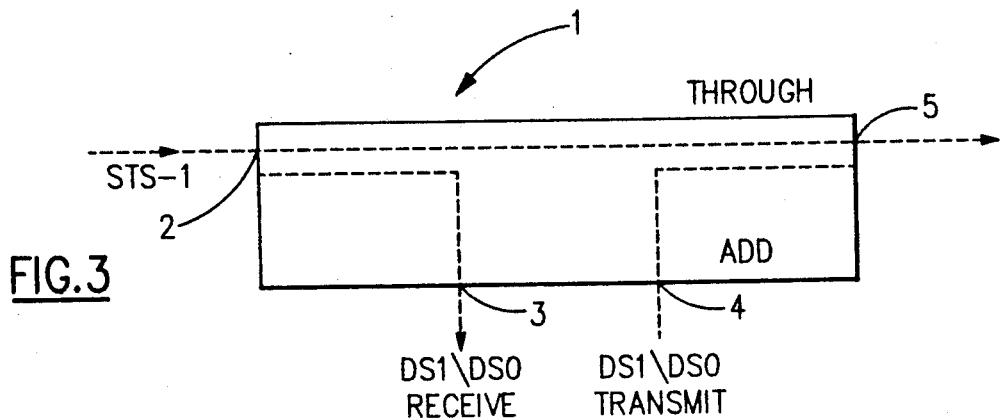
FIG. 3 shows schematically the operation of an add-drop multiplexer.
Figure 4:
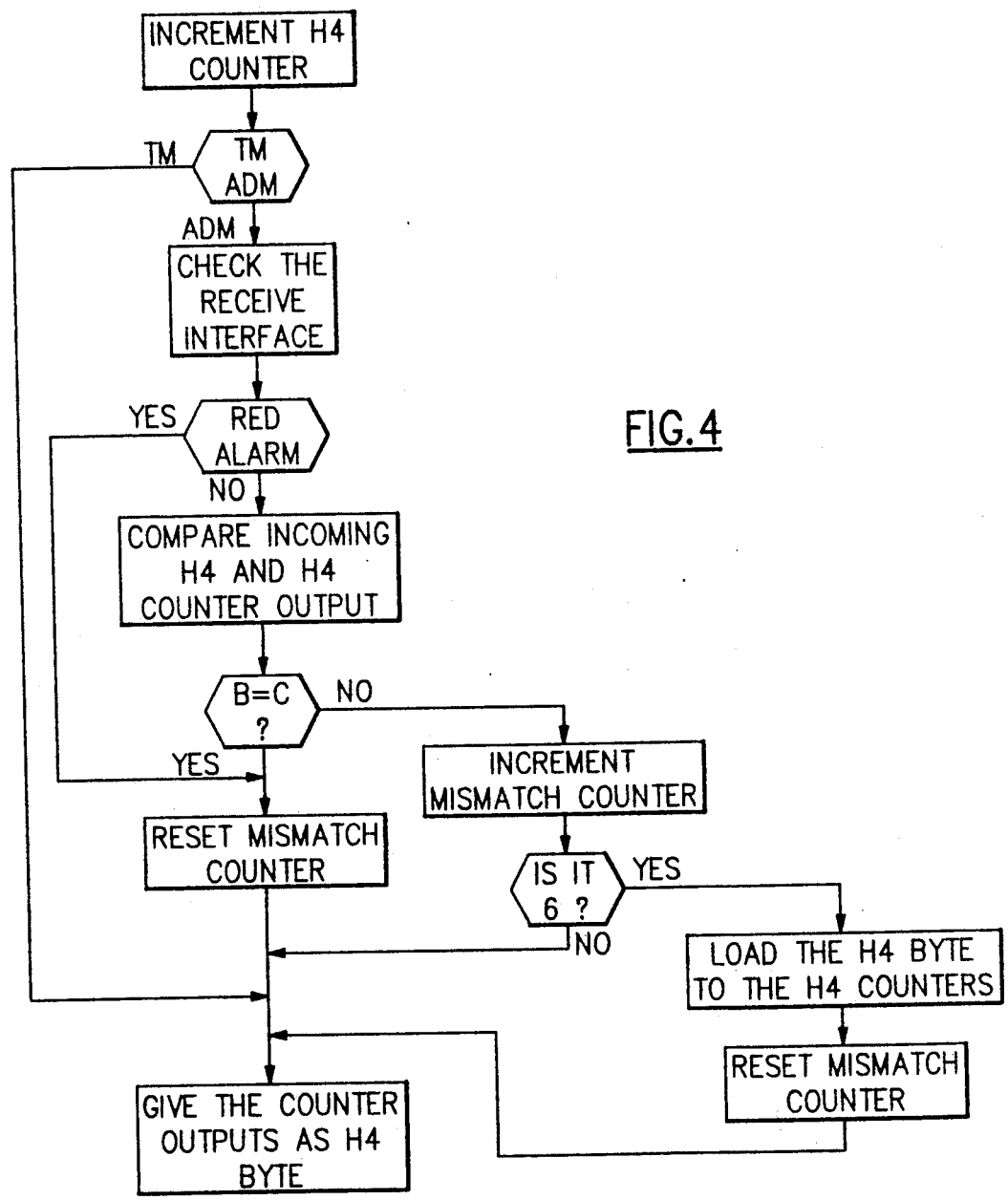
FIG. 4 shows a flow chart illustrating an algorithm for an H4 byte generating system.

FIG. 4 shows a flow chart for the H4 byte generation algorithm. An H4 byte counter which essentially comprises two separate counters, is continuously incremented each frame, and the output of the counter is provided as the transmitted H4 byte. A provisioning bit identifies whether the access product is an add-drop multiplexer or a terminal multiplexer. In the event that the access product is a terminal multiplexer, the H4 byte counter is allowed to free run continuously giving its output as the generated H4 byte. The algorithm is more complex in the case of an add-drop multiplexer, in which event the receive portion of the access product is polled to determine if a red alarm is present. If a red alarm is present, a mismatch counter is reset and essentially the H4 byte counter is allowed to free run providing its output as the H4 byte to be transmitted. If a red alarm is not present, selected bits of the H4 counter are compared with the incoming H4 byte from the receive side to determine if a match exists. If a match exists, the mismatch counter is reset to zero and the H4 counter output is provided as the generated H4 byte. If the incoming H4 byte and the selected bits of the counter output do not match, the mismatch counter is incremented; however, the H4 counter output is still provided as the generated H4 byte. When the mismatch counter reaches a count of six without being reset, the received H4 byte is loaded into the H4 counter, and the mismatch counter is reset.

Figure 5:
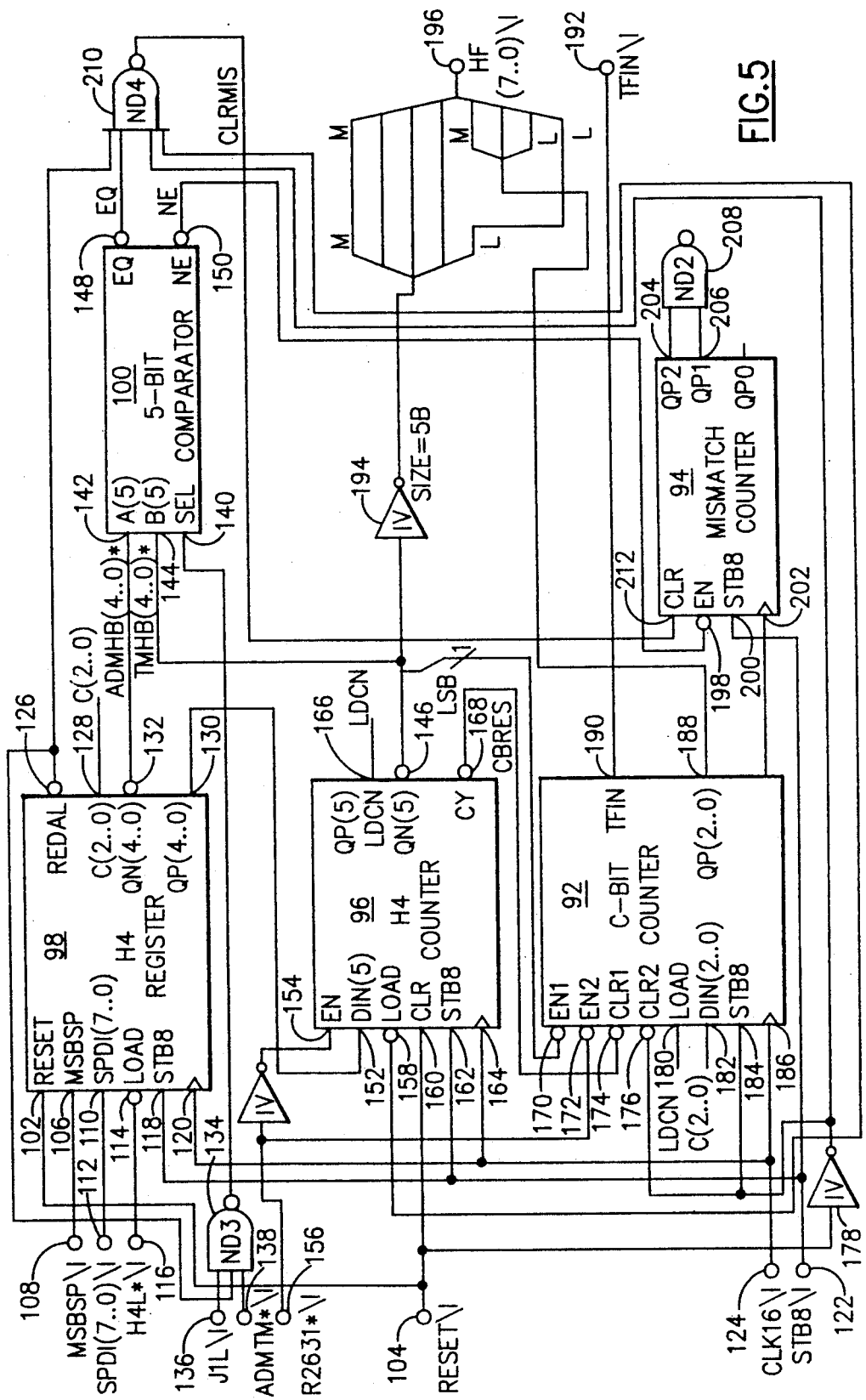
FIG. 5 shows a block diagram of an implementation of the algorithm of FIG. 4.

The algorithm illustrated in FIG. 4 is implemented by the circuit shown in FIG. 5. Referring to FIG. 5, the circuit includes a number of counters such as C-bit counter 92, a mismatch counter 94, and an H4 counter 96. An H4 register 98 receives and stores the H4 byte from the receive side of an access product, and outputs five selected H4 byte bits to an five-bit comparator 100.

H4 register 98 includes a reset input 102 connected to a terminal 104 for receiving a reset signal when the multiplexer is initially powered up. An input 106 of the H4 register is connected to receive a red alarm signal from terminal 108. Input 110 of the H4 register is connected to terminal 112 for receiving eight data bits of the data received on the receive side of the access product. Input 114 receives from terminal 116 a low-level signal during the time when the H4 byte is being received at the receive side of the access product. Inputs 118 and 120 are connected to terminals 122 and 124 respectively for receiving the 8-MHz and 16-MHz clock signals.

In response to the input signals, the H4 register loads the eight bits appearing on terminal 112 during the H4 byte time, as indicated by the input on terminal 116. H4 register 98 provides a red alarm output indication at output 126. Output 128 provides three output bits corresponding to the H4 bits 1, 2 and 3 for C1, C2 and C3, while output 130 provides five H4 bits corresponding to bits No. 0, 4, 5, 6 and 7, also identified respectively as bits T, SI1, SI2, P0 and P1 shown in Table 1. The red alarm output from 126 is provided to an input of a gate 134, which has two additional inputs connected to terminals 136 and 138. Terminal 136 receives a signal that is active during the J1 byte of the received SONET frame, while terminal 138 receives a provisioning bit from the processor indicating whether the access product is to function in an ADM mode or a TM mode. Gate 134 provides an output during the J1 byte period when the ADM mode is selected and when a red alarm is not present, said output being provided to an input 140 of five-bit comparator 100.

The five-bit comparator 100 also receives at an input 142 five bits from H4 register 98 at its output 132, which bits correspond to the inverse of the bits provided at output 130. An input 144 receives five bits corresponding to bits 0, 4, 5, 6 and 7 of the H4 byte generated by the H4 counter 96 and outputted on an output 146. Comparator 100 compares the five bits from the H4 counter with the five bits from the H4 register and provides an indication at an output 148 that the bits are equal, or an indication at an output 150 that the bits are not equal.

H4 counter 96 receives the five H4 bits outputted at output 130 of the H4 register at an input 152 while receiving an enable signal at input 154. The enable signal at 154 is provided through an inverter from a terminal 156 which receives a low-level signal during the period of time of byte 59 of the SPE. Thus, the H4 counter is enabled during the period of time that byte 59 of the SPE is received. An input 158 receives a load input signal derived from the output of the mismatch counter 94. An input 160 receives a reset signal from terminal 104, while inputs 162 and 164 receive the 8-MHz and 16-MHz clock signals from terminals 122 and 124. The H4 counter 96 provides five output bits at output 146, said five bits corresponding to bits 0, 4, 5, 6 and 7 of the H4 byte generated by the H4 counter. An output 166 provides a load signal to the C-bit counter 92, while an output 168 provides a carry output to the C-bit counter.

C-bit counter 92 includes an input 170 connected to receive the least significant bit of the output 146 of the H4 counter 96. A second enable signal is provided at an input 172, said second enable signal is derived from terminal 156 and is at a low level during the period of time when byte 59 of the SPE is being received. A first clear input 174 is connected to the carry output 168 of counter 96. A second clear input 176 receives an inverted reset signal from terminal 104 through an inverter 178. Terminal 180 receives the load signal generated at output 166 of counter 96. An input 182 receives three bits corresponding to bits C1, C 2 and C3 outputted at output 128 of the H4 register 98. Inputs 184 and 186 are connected to receive the 8-MHz and 16-MHz clock signals from terminals 122 and 124 respectively. The Cbit counter 92 provides at an output 188 three bits corresponding to bits C1, C2 and C3 of the H4 byte. The counter also provides at an output 190 a signal that alternates its state at every four frames, which signal is used for floating VT systems to indicate the four-frame boundaries of the DS1s, said signal being provided at an output 192.

The five bits output at 146 of the H4 counter 96 are provided to an inverter 194 for inverting all five output bits, which inverted bits are provided as bits 0, 4, 5, 6 and 7 of the multiplexer output 196. The bits provided at output 188 of counter 92 are interleaved with the bits from counter 96 to provide bits 1, 2 and 3 at output 196.

The mismatch counter 94 includes a terminal 198 for receiving an enable signal from the output 150 of the comparator 100. The mismatch counter also includes inputs 200 and 202 for receiving the 8-MHz and 16-MHz clock signals, with the 8-MHz clock signal being provided from terminal 122 and the 16-MHz clock signal being provided from terminal 124. Thus, the mismatch counter 94 is enabled when comparator 100 finds the compared bits to be not equal. Mismatch counter 94 has first and second outputs 204 and 206 for providing the two most significant bits of the counter output. These bits are connected as inputs to a gate 208 which provides an output when the mismatch counter reading is 110, indicating that a count of six has been reached. The output of gate 208 is connected to input 158 of the H4 counter 96 as the load input and also as an input of a gate 210.

Gate 210 has four inputs, one connected to the output of gate 208 as previously mentioned, one connected to receive an inverted reset signal from inverter 178, one connected to the EQ output 148 of the comparator 100, and one connected to receive the red alarm output from 126 of the H4 register 98. Gate 210 is responsive to any 0-level input signal to provide a 1-level output signal which is connected to a clear input 212 of the mismatch counter 94 to effect a clearing of the mismatch counter upon the occurrence of a red alarm, the mismatch counter reaching a count of six, an equal output from the comparator 100, or a reset signal being received by the circuit.

Referring to Table 2, there is shown the complete H4 byte sequence generated for each of 48 frames numbered 0–47 provided at output 196.

Figure 6:
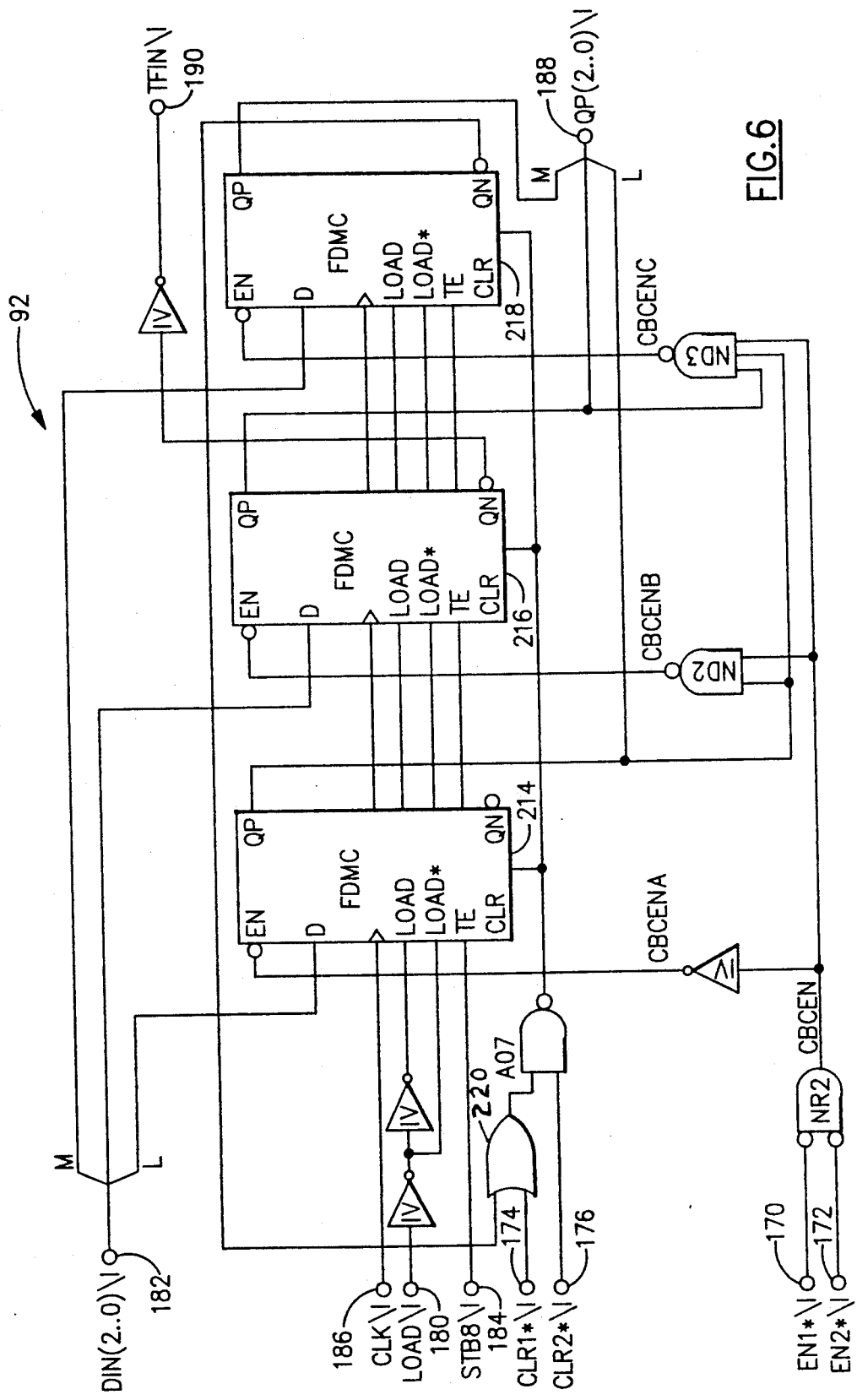
FIG. 6 is a schematic diagram of the C-bit counter of FIG. 5.

Referring to FIG. 6, there is shown a schematic diagram of the C-bit counter 92 which includes three flip-flops, 214, 216 and 218 for outputting the C1, C2 and C3 signals respectively. The flip-flops are enabled by the enable signals provided at inputs 170 and 172. The input provided at 172 is low during byte 59 of each SPE, while the input at 170 is low only during every other frame since it is connected to the least significant bit of output 146, which is the T-bit shown in Table 2. Thus, the counter is enabled every other frame. The CLR1 and CLR2 signals applied to inputs 174 and 176 function to clear the flip-flops. A reset signal applied to input 176 will clear the flip-flops immediately. A carry output from the H4 counter 96 is applied to input 174, which is connected to an input of gate 220. The carry output occurs at both frames 23 and 47, as shown in Table 2; however, the carry output occurring at frame 23 does not occur simultaneously with a 0 output at the inverted output of flip-flop 218 which is fed back to gate 220.

TABLE 2

| BIT: | P1 | Po | SI2 | SI1 | C3 | C2 | C1 | T | FRAMES |
|---|---|---|---|---|---|---|---|---|---|
| | 0 | 0 | 0 | 0 | 0 | 0 | 0 | 0 | 0 |
| | 0 | 0 | 0 | 0 | 0 | 0 | 0 | 1 | 1 |
| | 0 | 0 | 0 | 1 | 0 | 0 | 1 | 0 | 2 |
| | 0 | 0 | 0 | 1 | 0 | 0 | 1 | 1 | 3 |
| | 0 | 0 | 1 | 0 | 0 | 1 | 0 | 0 | 4 |
| | 0 | 0 | 1 | 0 | 0 | 1 | 0 | 1 | 5 |
| | 0 | 1 | 0 | 0 | 0 | 1 | 1 | 0 | 6 |
| | 0 | 1 | 0 | 0 | 0 | 1 | 1 | 1 | 7 |
| | 0 | 1 | 0 | 1 | 1 | 0 | 0 | 0 | 8 |
| | 0 | 1 | 0 | 1 | 1 | 0 | 0 | 1 | 9 |
| | 0 | 1 | 1 | 0 | 1 | 0 | 1 | 0 | 10 |
| | 0 | 1 | 1 | 0 | 1 | 0 | 1 | 1 | 11 |
| | 1 | 0 | 0 | 0 | 1 | 1 | 0 | 0 | 12 |
| | 1 | 0 | 0 | 0 | 1 | 1 | 0 | 1 | 13 |
| | 1 | 0 | 0 | 1 | 1 | 1 | 1 | 0 | 14 |
| | 1 | 0 | 0 | 1 | 1 | 1 | 1 | 1 | 15 |
| | 1 | 0 | 1 | 0 | 0 | 0 | 0 | 0 | 16 |
| | 1 | 0 | 1 | 0 | 0 | 0 | 0 | 1 | 17 |
| | 1 | 1 | 0 | 0 | 0 | 0 | 1 | 0 | 18 |
| | 1 | 1 | 0 | 0 | 0 | 0 | 1 | 1 | 19 |
| | 1 | 1 | 0 | 1 | 0 | 1 | 0 | 0 | 20 |
| | 1 | 1 | 0 | 1 | 0 | 1 | 0 | 1 | 21 |
| | 1 | 1 | 1 | 0 | 0 | 1 | 1 | 0 | 22 |
| | 1 | 1 | 1 | 0 | 0 | 1 | 1 | 1 | 23 |
| | 0 | 0 | 0 | 0 | 1 | 0 | 0 | 0 | 24 |
| | 0 | 0 | 0 | 0 | 1 | 0 | 0 | 1 | 25 |
| | 0 | 0 | 0 | 1 | 1 | 0 | 1 | 0 | 26 |
| | 0 | 0 | 0 | 1 | 1 | 0 | 1 | 1 | 27 |
| | 0 | 0 | 1 | 0 | 1 | 1 | 0 | 0 | 28 |
| | 0 | 0 | 1 | 0 | 1 | 1 | 0 | 1 | 29 |
| | 0 | 1 | 0 | 0 | 1 | 1 | 1 | 0 | 30 |
| | 0 | 1 | 0 | 0 | 1 | 1 | 1 | 1 | 31 |
| | 0 | 1 | 0 | 1 | 0 | 0 | 0 | 0 | 32 |
| | 0 | 1 | 0 | 1 | 0 | 0 | 0 | 1 | 33 |
| | 0 | 1 | 1 | 0 | 0 | 0 | 1 | 0 | 34 |
| | 0 | 1 | 1 | 0 | 0 | 0 | 1 | 1 | 35 |
| | 1 | 0 | 0 | 0 | 0 | 1 | 0 | 0 | 36 |
| | 1 | 0 | 0 | 0 | 0 | 1 | 0 | 1 | 37 |
| | 1 | 0 | 0 | 1 | 0 | 1 | 1 | 0 | 38 |
| | 1 | 0 | 0 | 1 | 0 | 1 | 1 | 1 | 39 |
| | 1 | 0 | 1 | 0 | 1 | 0 | 0 | 0 | 40 |
| | 1 | 0 | 1 | 0 | 1 | 0 | 0 | 1 | 41 |
| | 1 | 1 | 0 | 0 | 1 | 0 | 1 | 0 | 42 |
| | 1 | 1 | 0 | 0 | 1 | 0 | 1 | 1 | 43 |
| | 1 | 1 | 0 | 1 | 1 | 1 | 0 | 0 | 44 |
| | 1 | 1 | 0 | 1 | 1 | 1 | 0 | 1 | 45 |
| | 1 | 1 | 1 | 0 | 1 | 1 | 1 | 0 | 46 |
| | 1 | 1 | 1 | 0 | 1 | 1 | 1 | 1 | 47 |

Thus, gate 220 does not pass a clear signal during frame 23, and the flip-flops of the counter are only cleared after frame 47. Input 182 receives the C1, C2 and C3 bits from the output 128 of H4 register 98, which bits are loaded into the flip-flops upon the occurrence of a load signal at input 180. The load signal is provided at output 166 of the H4 counter 96 and indicates that the bits from the H4 register should be loaded into the counter due to the mismatch counter having reached a count of six.

Figure 7:
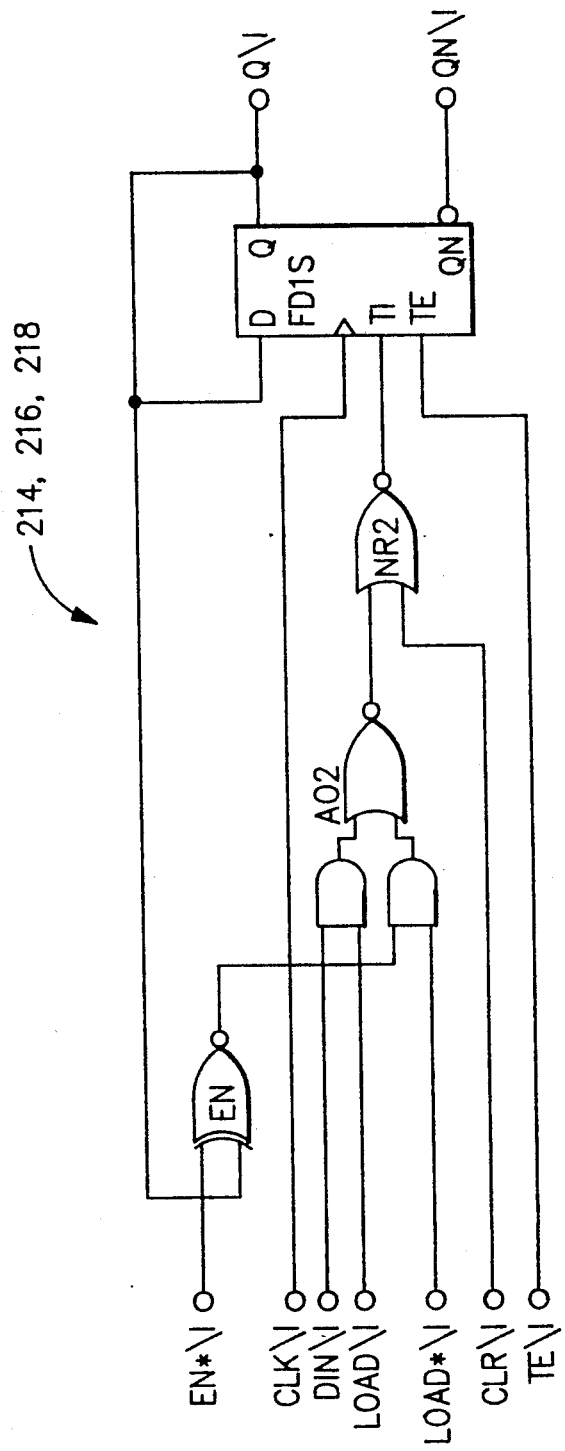
FIG. 7 is a schematic diagram of a flip-flop used in FIG. 6.

Referring to FIG. 7, there is shown a schematic diagram of the circuitry used to form the flip-flops 214, 216 and 218 of FIG. 6.

Output 190 is derived from the inverting output of flip-flop 216 which corresponds to bit C2 shown in Table 2 and alternates every fourth frame.

Output 188 provides three parallel bits corresponding to C1, C2 and C3 formed at the outputs of flip-flops 214, 216 and 218 respectively.

Figure 8:
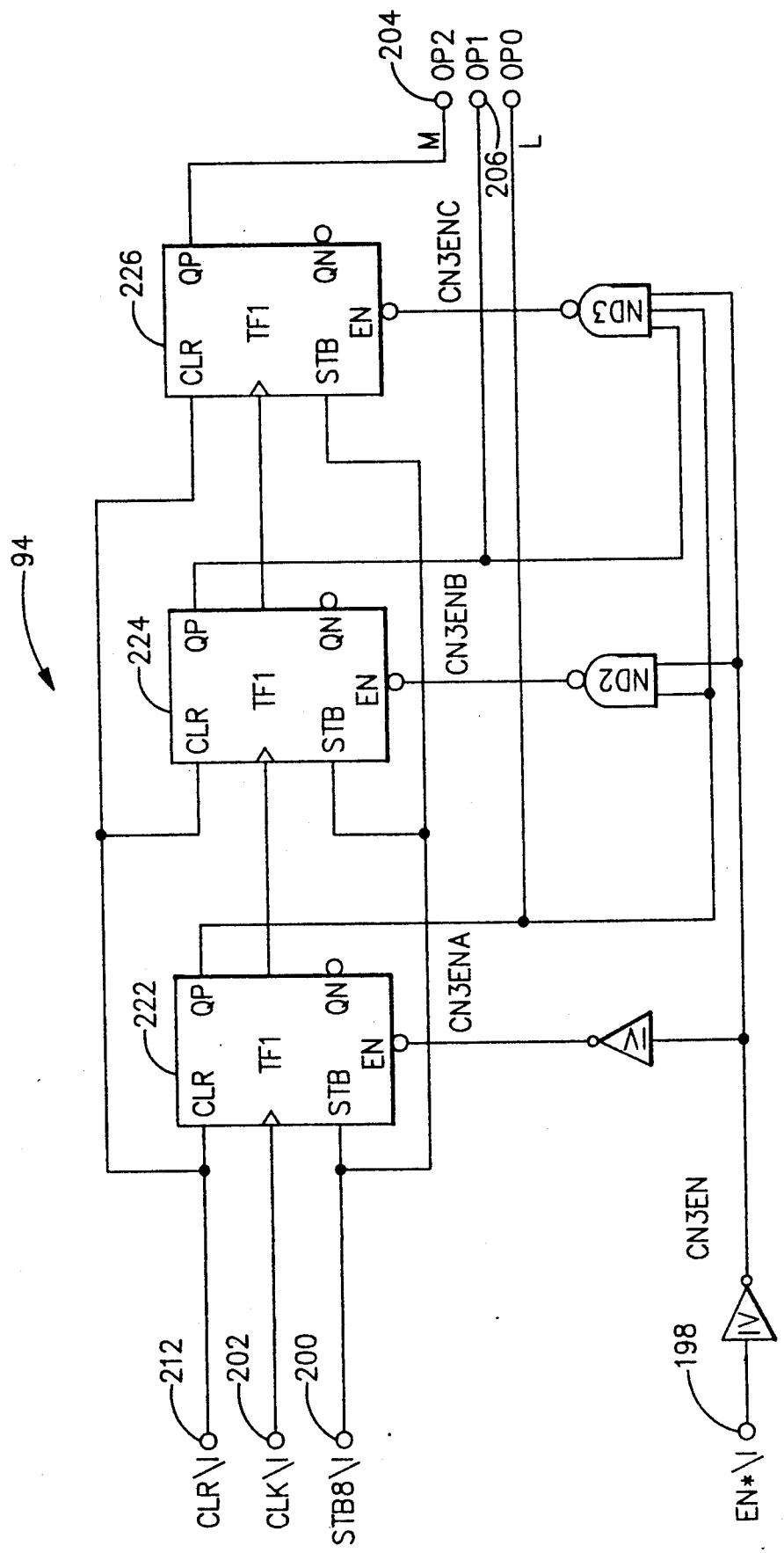
FIG. 8 is a schematic diagram of the mismatch counter shown in FIG. 5.

Referring to FIG. 8, there is shown a schematic diagram of the mismatch counter 94 which includes flip-flops 222, 224 and 226 for providing the outputs OP0, OP1 and OP2 of the mismatch counter. The circuitry of the counter is straightforward, and the counter is enabled by a not equal output from the comparator 100.

Figure 9:
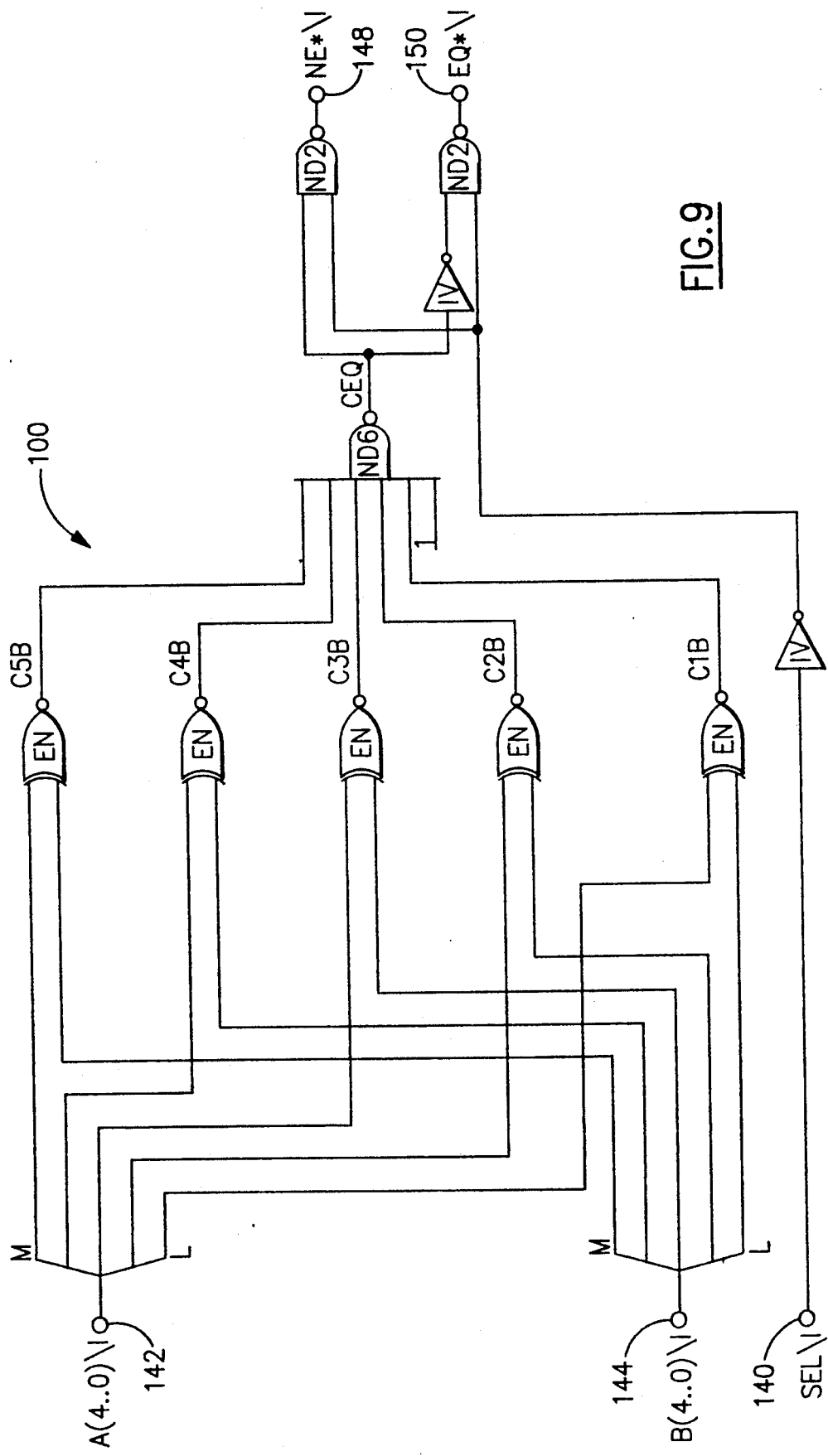
FIG. 9 is a schematic diagram of the five bit comparator shown in FIG. 5.

FIG. 9 shows the schematic diagram of the five-bit comparator 100 wherein five bits from the H4 register 98 are compared with five bits from the H4 counter 96 to provide outputs during the J1 byte indicating whether the bit sequences are equal or not equal.

Figure 10A:
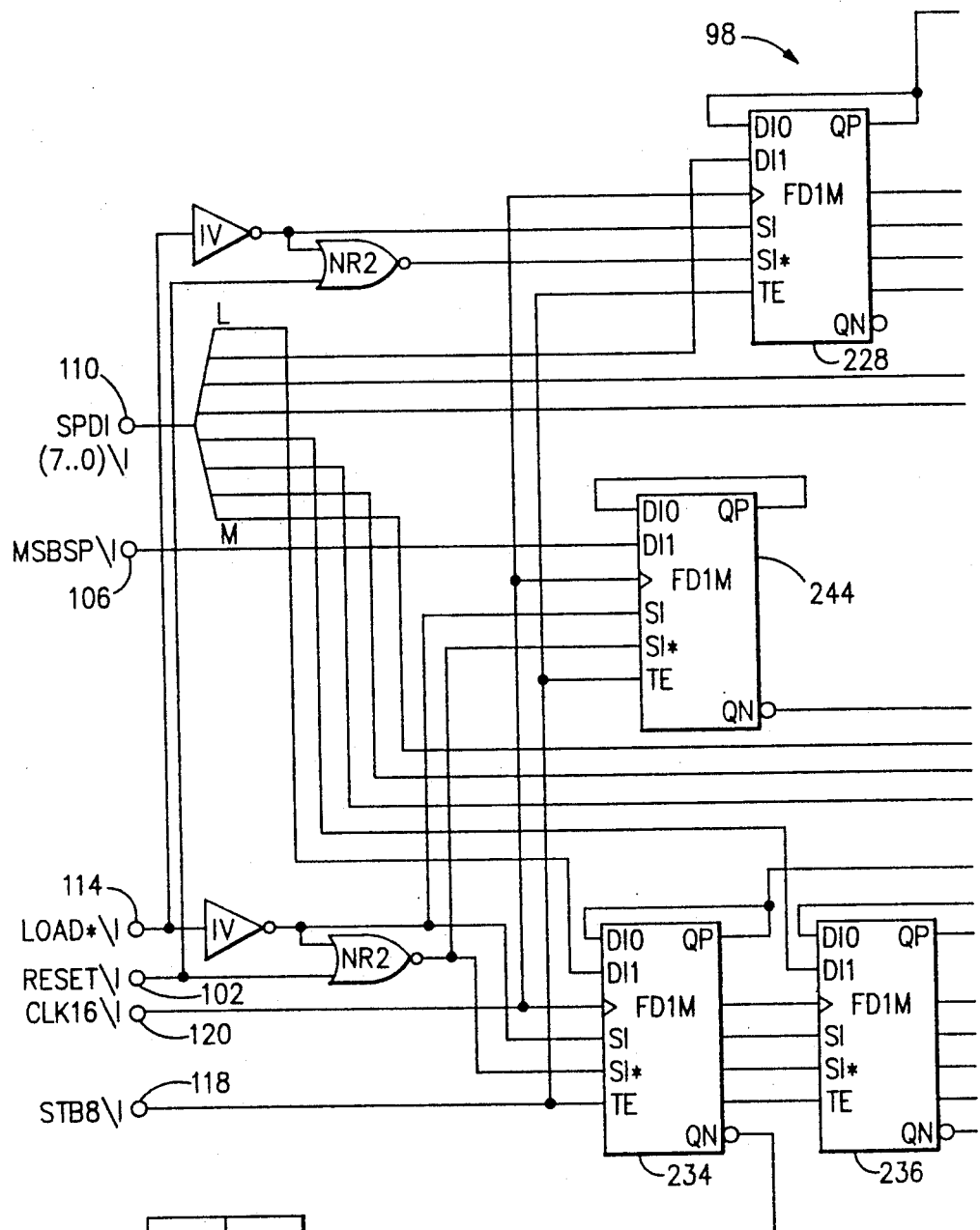
FIG. 10 is a schematic diagram of the H4 register shown in FIG. 5.
Figure 10B:
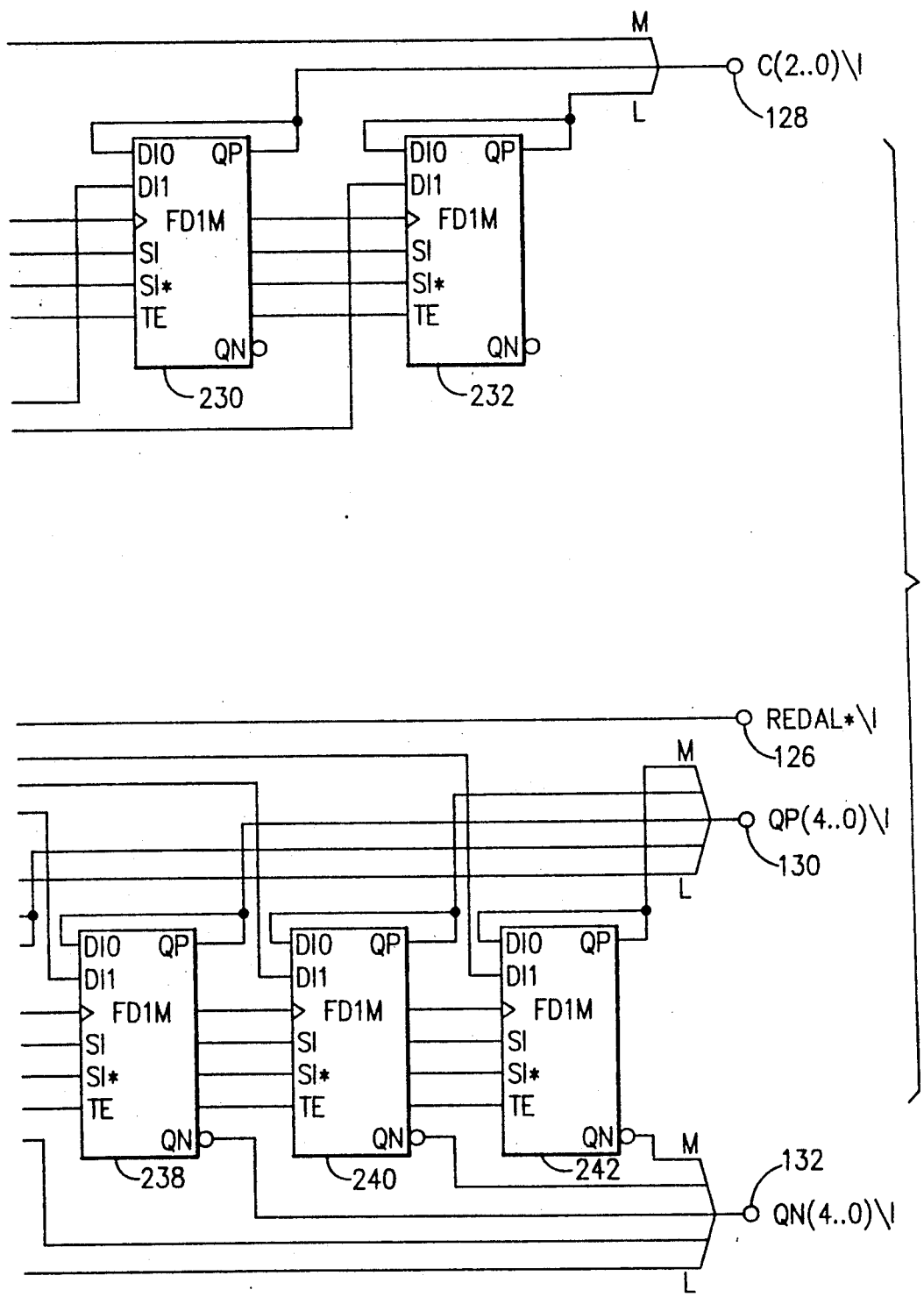

Referring to FIG. 10, there is shown a schematic diagram for the H4 register 98 which receives at input 110 eight bits corresponding to a SONET input byte. The input is loaded to the register during the H4 byte, as indicated by the load signal received on input 114 which is the inverse of an H4 active signal. Bits 1, 2 and 3 provided at input 110 are directed to flip-flops 228, 230 and 232 for storing the C1, C2 and C3 bits respectively. The outputs of flip-flops 228, 230 and 232 are provided at output 128. Bits 0, 4, 5, 6 and 7 at input 110 are provided to flip-flops 234, 236, 238, 240 and 242 respectively, which flip-flops provide the H4 output bits 0, 4, 5, 6 and 7 at output 130, while the inverse of these bits are provided at output 132. Input 106 receives the red alarm which is loaded into a flip-flop 244 during the H4 byte. The red alarm is stored in flip-flop 244 and provided at output 126.

Figure 11A:
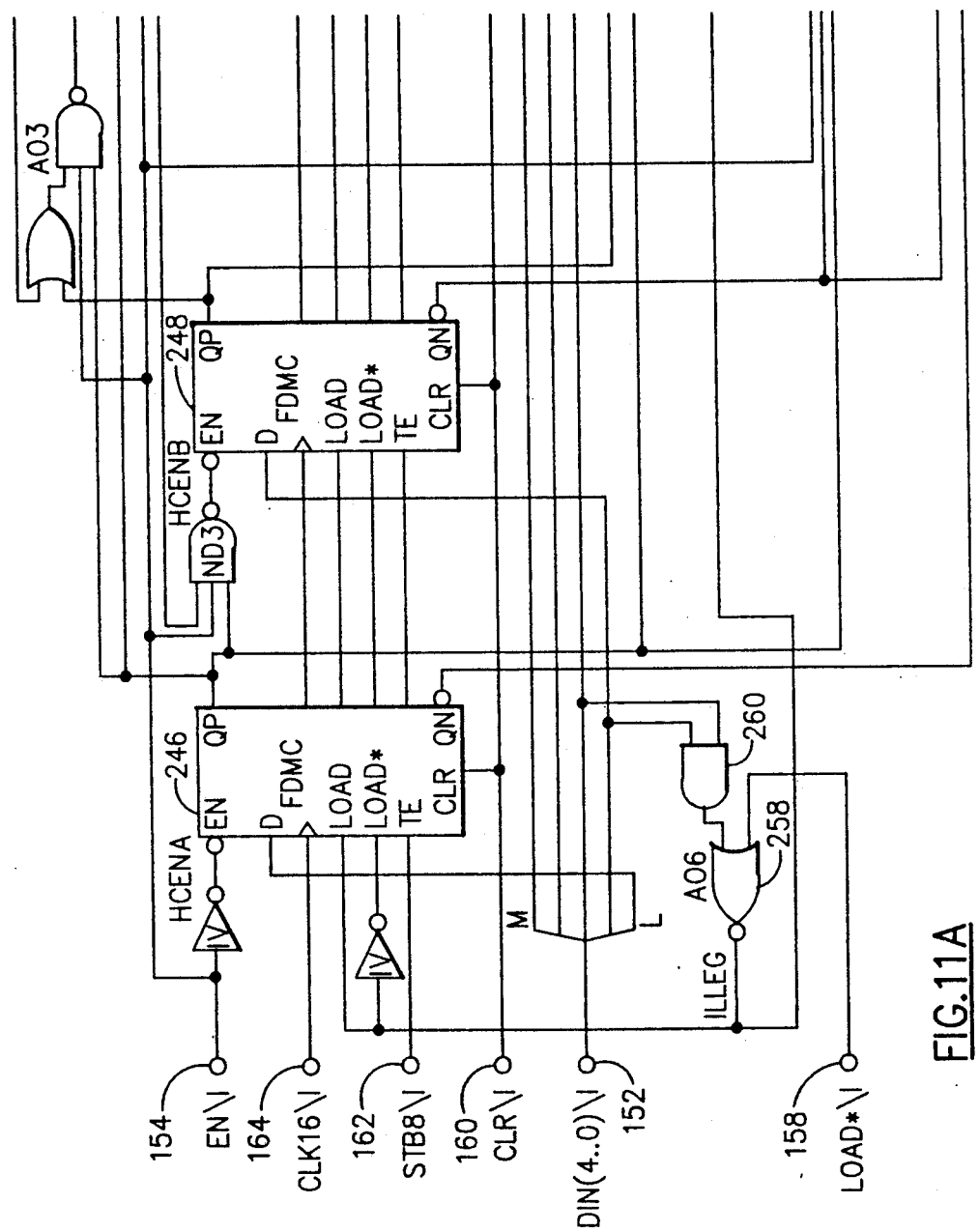
FIG. 11 is a schematic diagram of the H4 counter shown in FIG. 5.

FIG. 11 shows a schematic diagram for the H4 counter 96. The counter uses a plurality of flip-flops 246, 248, 250, 252 and 254, each constructed as shown in FIG. 7. The flip-flops generate five output signals corresponding to bits 0, 4, 5, 6 and 7 of the H4 byte at an output 256, while the inverse of these signals is provided at an output 146. These signals are shown in Table 2 as bits T, SI1, SI2, P0 and P1 which provide bit sequences corresponding to frames 0–23. A clear signal provided at input 160 from the reset signal causes all flip-flops to revert to the 0 state. Input 152 receives five bits from output 130 of the H4 register which correspond to the stored H4 byte. These bits are loaded into the flip-flops upon the occurrence of a load signal at input 158, which signal is derived from the output of the mismatch counter 94. The load input 158 is connected to the input of a gate 258 which includes a second input connected to a gate 260 having two inputs connected to bits 4 and 5 of the H4 signal. From a review of Table 2 it is apparent that bits 4 and 5, namely bits SI1 and SI2 are never at logic level 1 at the same time if valid H4 data is being received at the receive side. Thus, the output of gate 260 should always be 0, which when combined to a 0-level signal at input 158 will provide a valid load signal to output 166 and to the flip-flops 246–254.

Thus, the H4 counter 96 is incremented to provide the bit sequences for bits T, SI1, SI2, P0 and P1 shown in Table 2, unless a load signal is received from them mismatch counter, at which time the received H4 bits from the receive side will be loaded into the flip-flops. A gate 262 is connected to receive at its inputs the non-inverting flip-flop outputs of flip-flops 246, 250, 252 and 254, the inverting output from flip-flop 248, and the enable signal from input 154. In response to these inputs, gate 262 provides a carry signal to output 168 each time the H4 output corresponds to 11101 representing frames 23 and 47 shown in Table 2. The carry signal is provided at output 168 to C-bit counter 92 to function as the CLR1 signal.

Thus, the present invention provides an algorithm and an implementation thereof in which an H4 byte generating circuit is provided for a transmit side which includes counters for generating the H4 byte and means for comparing the counter output with a received H4 byte. Mismatches between the received H4 byte and the counter output are accumulated and upon the occurrence of six mismatches the H4 counter is loaded with the received H4 byte. The mismatch counter is reset to 0 when its output reaches six, when an alarm bit is sensed, when the multiplexer is activated by a reset signal, and when the comparator indicates a match.

What is claimed is:

1. In an access apparatus for a SONET transmission system of the type that transmits information in frames, each frame having tributaries with channels, a plurality of frames forming a superframe, a device for generating H4 bytes, comprising:
   means for receiving SONET-formatted bytes from the SONET transmission system;
   means for extracting H4 bytes from the received SONET bytes;
   means for sequentially generating H4 bytes for each SONET frame;
   means for comparing at least a portion of the extracted H4 bytes with a like portion of the generated H4 bytes and for providing an output indicative of a match or lack thereof;
   a mismatch counter receiving the output of the comparing means and in response thereto being incremented if a match is not indicated and being reset if a match is indicated, said counter providing an output when a predetermined count is generated;
   means for loading the extracted H4 byte into the sequential H4 byte generating means in response to an output from said counter; and
   means for resetting said counter upon the loading of the extracted H4 byte into the generating means.

2. An access apparatus as described in claim 1, additionally comprising:
   means for sensing an alarm condition on the received SONET bytes; and
   means responsive to the sensing of an alarm condition to reset said mismatch counter.

3. An access apparatus as described in claim 1, wherein the means for generating H4 bytes comprises a first counter for generating a first number of bits for the H4 byte and a second counter for generating a second number of bits for the H4 byte; and
   means for combining the bits of said counters to form the H4 byte.

4. An access apparatus as described in claim 3, wherein the means for comparing compares bits generated by the first counter with the corresponding bits of extracted H4 bytes.

5. An access apparatus as described in claim 1, additionally comprising means for resetting said mismatch counter each time the access apparatus is activated.

6. An access apparatus as described in claim 1, additionally comprising means for allowing the means for generating H4 bytes means to run free for a particular mode of access apparatus operation by inhibiting said comparator means.

7. A method for generating H4 bytes in an access apparatus for a SONET transmission system of the type that transmits information in frames, each frame having tributaries with channels, a plurality of frames forming a superframe, comprising the steps of:
   receiving SONET bytes from said SONET transmitting system;
   extracting H4 bytes from said received bytes;
   generating sequential H4 bytes for each SONET frame with an H4 byte generating means;

comparing at least a portion of the generated H4 bytes with a like portion of the extracted H4 bytes to determine if there is a match or a mismatch;

incrementing a mismatch counter if a mismatch is indicated;

resetting the mismatch counter if a match is indicated;

outputting a signal from said mismatch counter when the counter reaches a predetermined value;

loading an extracted H4 byte into the H4 byte generating means in response to an output from said mismatch counter; and resetting said mismatch counter in response to the output from the mismatch counter.

8. A method as described in claim 7, additionally comprising the steps of:

sensing an alarm condition in the received SONET bytes; and resetting the mismatch counter in response to said alarm condition.

9. A method for generating H4- bytes in an access apparatus for a SONET transmission system of the type that transmits information in frames, each frame having tributaries with channels, a plurality of frames forming a superframe, comprising the steps of:

receiving SONET bytes from said SONET transmitting system;

extracting H4 bytes from said received bytes;

generating sequential H4 bytes for each SONET frame with an H4 byte generating means;

comparing at least a portion of the extracted H4 byte with a like portion of the generated H4 bytes to determine if there is a match or a mismatch;

resetting the H4 byte generating means to the value of an extracted H4 byte after a predetermined number of mismatches occur;

sensing an alarm condition in the received SONET bytes; and allowing the H4 byte generating means to run free when an alarm is sensed.

* * * * *